(12) United States Patent
Stubler

(10) Patent No.: US 6,587,156 B1
(45) Date of Patent: Jul. 1, 2003

(54) METHOD FOR DETECTING MOSAIC FADES IN DIGITIZED VIDEO

(75) Inventor: Peter O. Stubler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/293,690

(22) Filed: Apr. 16, 1999

(51) Int. Cl.[7] .............................. H04N 5/14; H04N 9/64
(52) U.S. Cl. ...................................................... 348/700
(58) Field of Search ................................ 348/700, 239; 375/240.12

(56) References Cited

U.S. PATENT DOCUMENTS

| | | | |
|---|---|---|---|
| 5,099,322 A | * | 3/1992 | Gove ........................... 348/700 |
| 5,227,863 A | * | 7/1993 | Bilbrey et al. ............... 348/578 |
| 6,459,459 B1 | * | 10/2002 | Ratakonda .................... 348/700 |

* cited by examiner

*Primary Examiner*—Wendy R. Garber
*Assistant Examiner*—James M Hannett
(74) *Attorney, Agent, or Firm*—David M. Woods

(57) ABSTRACT

A method for automatically detecting a segment where a mosaic fade, formed by a plurality of tiles, occurs in a digital video, the method comprising the steps of: locating the segment of the digital video containing the plurality of tiles in each frame; detecting whether the tiles, within the located segment, have a predetermined increase or decrease in size from one frame to a next frame; identifying a boundary of the mosaic fade based on the previous step.

12 Claims, 3 Drawing Sheets

METHOD FOR DETECTING MOSAIC FADES IN DIGITIZED VIDEO

FIELD OF THE INVENTION

The invention relates generally to the field of detecting segment boundaries in digitized video and, more particularly, to detecting such segment boundaries in digitized video originating from camcorders having a mosaic fade feature.

BACKGROUND OF THE INVENTION

A variety of camcorders are currently available for personal and professional videotaping. These camcorders are capable of recording and storing hours of video from which the user may desire to extract the salient content and/or perform automatic summarization. There are currently a variety of prior art methods available for detecting segment boundaries to assist in this extraction and summarization.

A segment is usually defined as a temporally ordered sequence of frames captured by one camera in a single operation. The simplest type of segment boundary to detect is a cut, typified by an abrupt change in the content of the image frame. This occurs when one continuous operation of a camera has ceased, and another has begun. These segment boundaries can be detected through a variety of currently available means including color histogram differences and pixel differences between adjacent frames.

However, special effects added during capture or editing introduce other types of segments whose boundaries that can be very difficult to detect because of their nuances. These special effect transitional segments include fades, dissolves, and wipes.

Many camcorders and video editing suites currently have a fade feature in which, for a fade out, a normal image is gradually darkened until the image is completely black, or for a fade in, a completely black image is gradually lightened until the image is normal. The boundaries of these transitional segments can be detected through a variety of currently available means including tracking the changes in image illumination.

A similar type of transitional segment currently available in many camcorders and video editing suites is a mosaic (or tiled) fade. A mosaic fade is similar to a traditional fade in that one end of the fade displays a normal image while the other end displays an image with little or no meaningful content. A typical traditional fade out begins with a normal image, and as the sequence progresses, each consecutive frame is darker than the preceding one until the frame contains nothing but black. In a mosaic fade out, the apparent resolution of the image is decreased until the image appears to break up into an array of uniformly colored tiles that grow in size until the frame contains only a few large tiles.

It is noted that some camcorders embed time and date information into the data stream. While many currently popular consumer video formats support time and date data embedding, the cost of implementation has relegated this feature to only a few high-end analog camcorders; this time and date information is typically available in most digital camcorders. If available, the time and date information simplifies the task of cut detection and aids in the detection and identification of special effect transitions.

Time and date information aids in the detection of special effect transitions by identifying temporal discontinuities that occur at one end of the transitional segment. Even with this information, the frames leading to and from the segment boundary must be examined to determine the presence and character of special effect transition(s). However, if this information is unavailable, the detection of these special effect transitions and their attendant boundaries by prior art methods is more difficult, if detectable at all.

Consequently, a need exists for detecting mosaic fades and identifying their boundaries in digitized video containing them.

SUMMARY OF THE INVENTION

The present invention is directed to overcoming one or more of the problems set forth above. Briefly summarized, according to one aspect of the present invention, the invention resides in a method for automatically detecting a segment where a mosaic fade, formed by a plurality of tiles, occurs in a digital video, the method comprising the steps of: locating the segment of the digital video containing the plurality of tiles in each frame; detecting whether the tiles, within the located segment, have a predetermined increase or decrease in size from one frame to a next frame; identifying a boundary of the mosaic fade based on step (b).

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the advantage of detecting mosaic fades in digitized video.

BRIEF DESCRIPTION OF THE DRAWINGS

FIG. 3(*b*) is a graph illustrating the binary representation after the application of the threshold;

FIG. 3(*c*) is a graph illustrating an autocorrelation of the binary representation of the gradient signal.

DETAILED DESCRIPTION OF THE INVENTION

In the following description, the present invention will be described in the preferred embodiment as a software program. Those skilled in the art will readily recognize that the equivalent of such software may also be constructed in hardware.

Still further, as used herein, computer readable storage medium may comprise, for example; magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before discussing the present invention, it is instructive to note that the present invention is implemented on a computer system. Such computer systems are well known in the art and will not be discussed in detail herein. Still further, the present invention is also for digitized video. If not captured in digital format, the video may be captured in analog format and converted to digitized video, as is well known in the art. The digitized video includes a plurality of frames each having a plurality of pixel values, as is also well known in the art.

Figure 1:
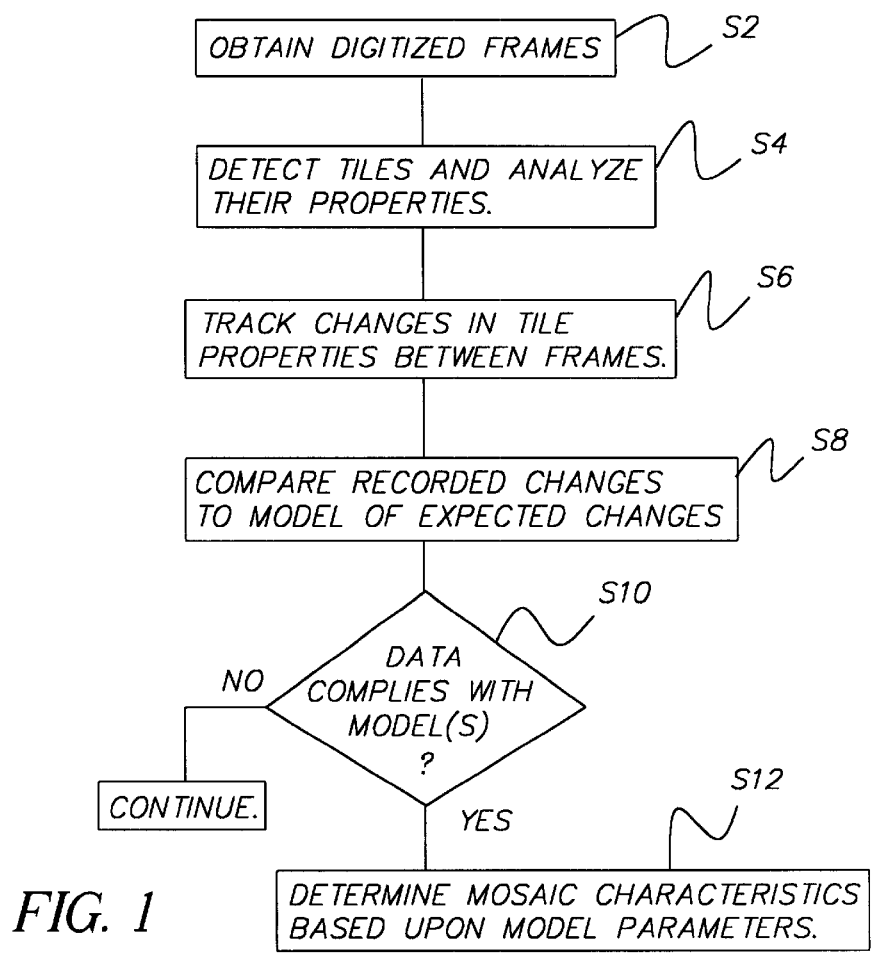
FIG. 1 is a flowchart illustrating an overview of the software program of the present invention.

Referring to FIG. 1, the software is initiated S2 and, each image frame of digitized video is made available for processing. In S4, the presence of tiles is determined, and if present the properties of the tiles are measured and recorded. Those skilled in the art will readily recognize that, given the disclosure herein, one may derive other methods of inferring the presence and spacing of periodic elements. These methods may include, but are not restricted to, mathematical transformations into the frequency domain of information derived from the image frame. The following description explains the methods employed in the preferred embodiment.

Changes in tile properties between frames are tracked in S6. These recorded changes are compared to models of expected behavior, to find patterns of change consistent with those of a mosaic fade. If the recorded changes in tile properties comply adequately with the model of behavior in S10, a mosaic fade is declared. In S12, the model to which the data complies, and the parameters of that model by which the data complies, are examined to determine the characteristics of the fade.

Figure 2:
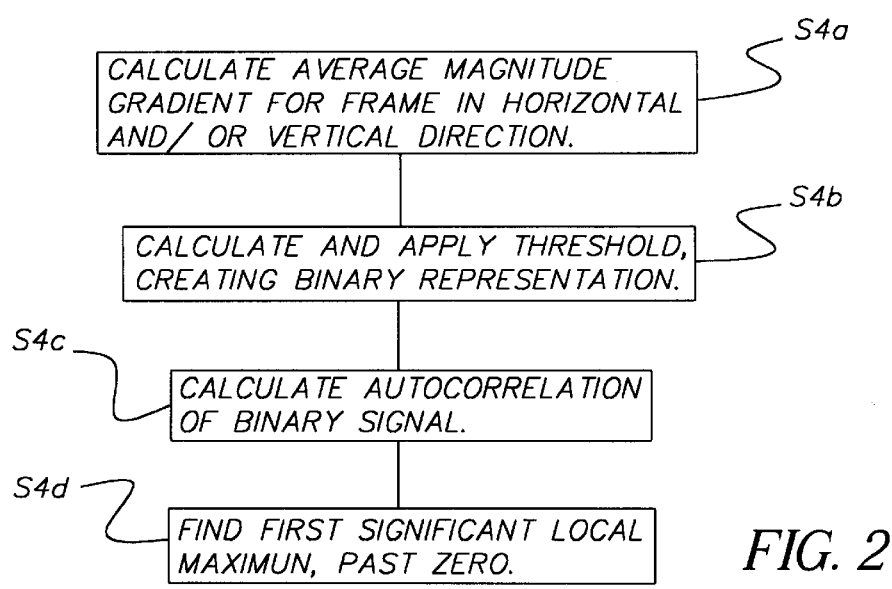
FIG. 2 is a flowchart illustrating in detail a portion of the software program of the present invention.

Referring to FIG. 2, the details of step S4 are illustrated. The average magnitude gradient of each frame is calculated S4a in the horizontal and vertical directions. The average gradient in the vertical direction $g_y(j)$ and the average gradient in the horizontal direction $g_x(i)$ are preferably calculated with the following equations, where W and H are respectively the width and height of the image. The term $f(i,j)$ is a general function representing an image with pixel locations represented by coordinates $(i, j)$, where i is the column location and j is the row location. To minimize the effects of interlace artifacts, the vertical gradient is calculated across four lines.

$$g_y(j) = \frac{1}{2W} \sum_{i=0}^{W-1} |f(i,j) + f(i,j+1) - f(i,j+2) - f(i,j+3)| \qquad \text{Eq. 1}$$

$$g_x(i) = \frac{1}{H} \sum_{j=0}^{H-1} |f(i,j) - f(i+1,j)| \qquad \text{Eq. 2}$$

Figure 3A:
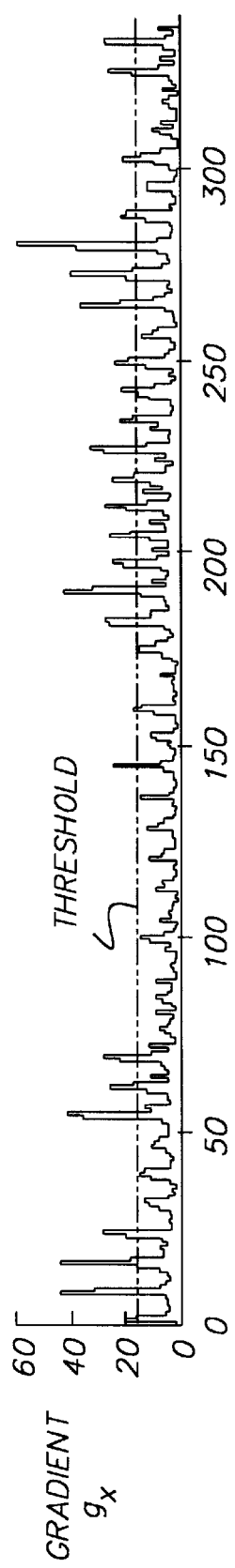
FIG. 3(*a*) is a graph illustrating an example gradient with a threshold level applied thereto.

If strong rectilinearly aligned edges are present in the image frame, the effect of averaging the magnitude gradient will be additive; non-rectilinearly aligned edges will be suppressed in the averaging function. Referring to briefly to FIG. 3(a), there is illustrated a typical plot of the result of equations 1 and 2 for an image frame with tile elements. The abscissa is either the particular row or column for the frame of interest and the ordinate is the gradient value.

Figure 3B:
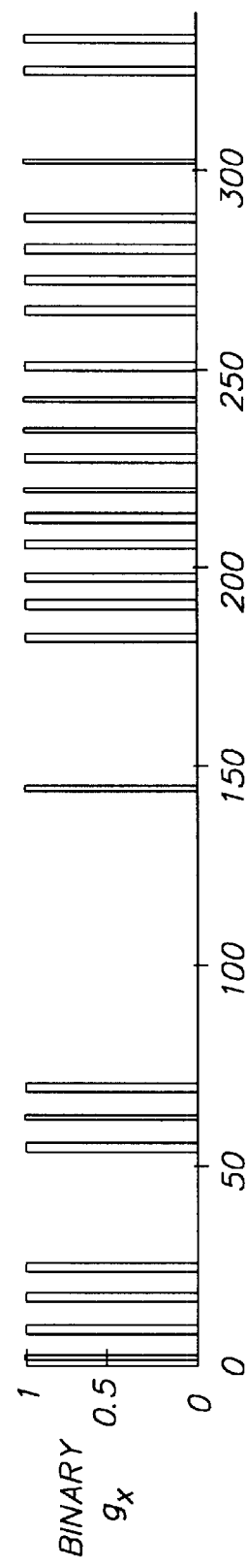

Referring to FIGS. 2 and 3(a), a threshold is calculated and applied S4b to the gradient signals that, in turn, create a binary representation; the results of which are shown in FIG. 3(b). The values above the threshold are converted to one and the values below the threshold are converted to zero. It is instructive to note that, although only one gradient is shown, the operation is performed on both gradients. The thresholded gradients $g_y^{th}$ and $g_x^{th}$ can be calculated as follows:

$$g_y^{th} = \begin{cases} 1 & g_y \geq \mu_{g_y} + k\sigma_{g_y} \\ 0 & \text{otherwise} \end{cases} \qquad \text{Eq. 3}$$

$$g_x^{th} = \begin{cases} 1 & g_x \geq \mu_{g_x} + k\sigma_{g_x} \\ 0 & \text{otherwise} \end{cases} \qquad \text{Eq. 4}$$

where $\mu_g$ is the mean of the gradient signal, $\sigma_g$ is the standard deviation of the gradient signal and constant k controls the sensitivity of the threshold. The constant k will preferably provide adequate results in the range 0.5 to 0.9; 0.66 was chosen as the default value of k.

Figure 3C:
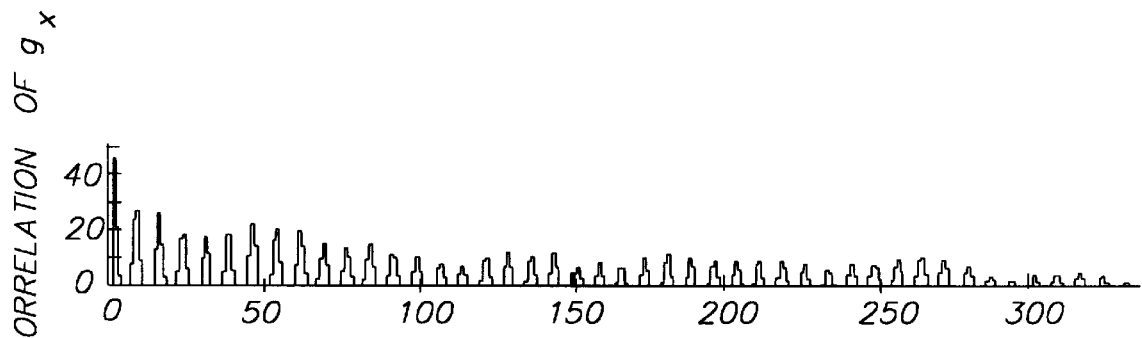

Referring to FIGS. 2 and 3(c), after applying a threshold to the average gradient, an autocorrelation is calculated S4c on the resultant signal. The autocorrelation $c_y$ and $c_x$ can be calculated with the following equations. W and H are the width and height respectively of the image.

$$c_y(j) = \frac{1}{W} \sum_{w=0}^{W-2} g_y^{th}(j) g_y^{th}(j+w) \qquad \text{Eq. 5}$$

$$c_x(i) = \frac{1}{W} \sum_{w=0}^{H-2} g_x^{th}(j) g_x^{th}(i+w) \qquad \text{Eq. 6}$$

The tile spacing is estimated to be the index of the first significant local maximum of the autocorrelation after zero S4d. A significant maximum exceeds one-half of the value of the autocorrelation at zero. If no significant maximum is found, then the tile spacing is declared to be zero.

Referring to FIG. 1, in order to detect a mosaic fade, changes in the tile spacing must be tracked S6. In S8, the measured changes in tile characteristics are with one or more models of expected change for mosaic fades. For example, a mosaic fade out may be indicated by a linearly increasing tile size starting from or near zero, while a mosaic fade in may be indicated by a linearly decreasing tile size ending at or near zero. For this example, the preferred embodiment may follow the steps illustrated in FIG. 4.

Figure 4:
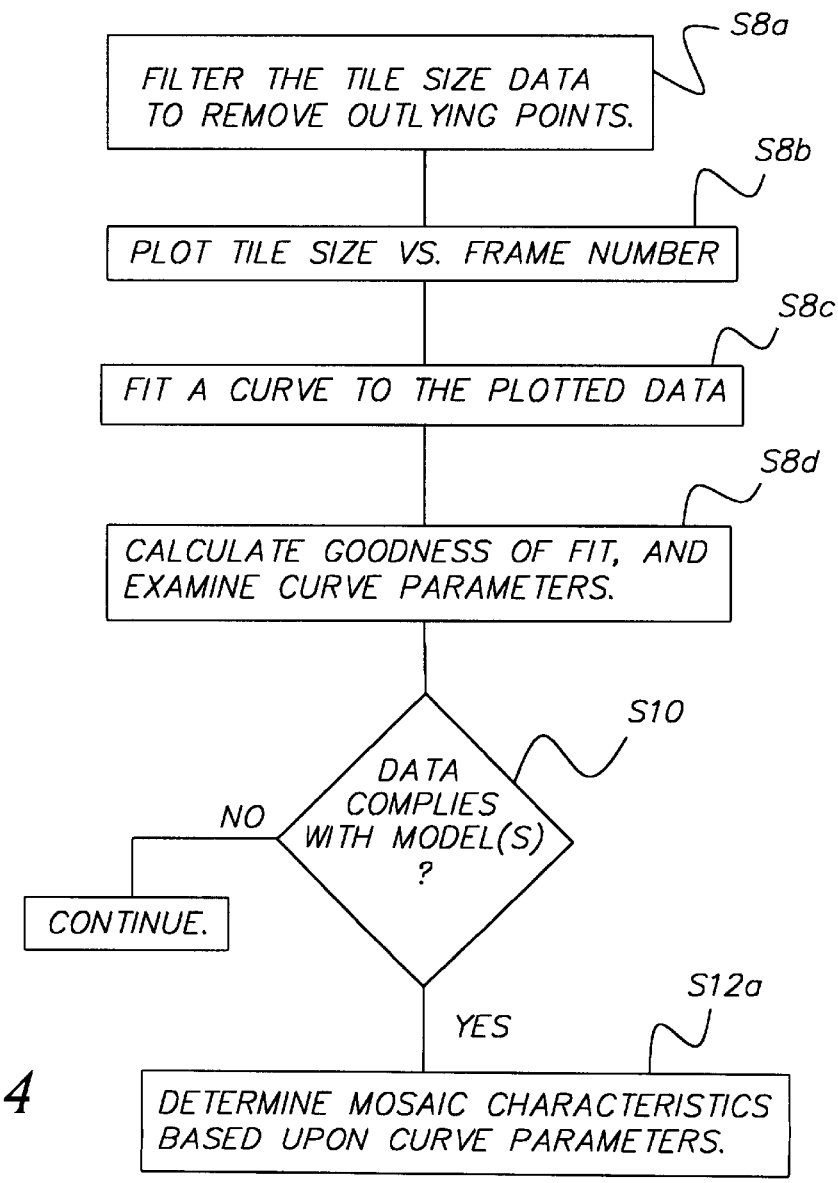
FIG. 4 is a flowchart illustrating in detail portions of the software program of the present invention.

Referring to FIG. 4, the details of step S8 are described. The tile size data is filtered S8a to remove outlying data points. This may be done via median filtering in which the neighborhood is a symmetric window of frames surrounding the frame number in question, or simply by deleting data points that deviate from their immediate neighbors by more than the maximum expected frame-to-frame change. In S8b, the remaining data points are plotted such that the abscissa is the horizontal or vertical tile size and the ordinate is the number of the frame of interest. In S8c, a curve is fit to the plotted points. For the example cited above, where a linear change in tile dimension is expected, a straight line may be fit using a least-square method. The range of the ordinate over which the line is fitted may be controlled to limit the range of response and to obtain an optimal fit.

In step S8d, the correlation of the data and the fitted line, as are the slope and intercept. If these parameters are judged to be within acceptable limits in S10, then a mosaic fade is declared. In S12a, the ordinate intercept indicates one end of the mosaic fade. The other end of the mosaic fade will be signified by a local maximum in tile size. The sign of the slope indicates whether the mosaic fade is in or out, while its magnitude indicates the rate.

The invention has been described with reference to a preferred embodiment. However, it will be appreciated that variations and modifications can be effected by a person of ordinary skill in the art without departing from the scope of the invention. For example, steps within S4 may be performed in the frequency domain without departing from the scope of the invention.

What is claimed is:

1. A method for automatically detecting a segment where a mosaic fade, formed by a plurality of tiles, occurs in a digital video, the method comprising the steps of:
   (a) locating the segment of the digital video containing the plurality of tiles in each frame;
   (b) detecting whether the tiles, within the located segment, have a predetermined increase or decrease in size from one frame to a next frame;
   (c) identifying a boundary of the mosaic fade based on step (b).

2. A method as in claim 1, wherein step (b) further includes the steps of:
   (d) fitting a curve to a plot of the tile size verses frame number
   (e) analyzing the fitted curve to determine the presence of mosaic fade, its type, and its duration.

3. A method as in claim 1, wherein step (b) further includes finding the tile sizes in each frame within the located segment, by computing autocorrelation of the tile boundary locations.

4. A method as in claim 1, wherein step (b) further includes finding the tile sizes in each frame within the located segment, by computing the frequency transform of the tile boundary locations.

5. A system for automatically detecting a segment where a mosaic fade, formed by a plurality of tiles, occurs in a digital video, the system comprises:
   (a) means for locating the segment of the digital video containing the plurality of tiles in each frame;
   (b) means for detecting whether the tiles, within the located segment, have a predetermined increase or decrease in size from one frame to a next frame;
   (c) means for identifying a boundary of the mosaic fade based on step (b).

6. The system as in claim 5, wherein the detecting means includes:
   (d) means for fitting a curve to a plot of the tile size verses frame number
   (e) means for analyzing the fitted curve to determine the presence of mosaic fade, its type, and its duration.

7. The system as in claim 5, wherein the detecting means includes means for finding the tile sizes in each frame within the located segment, by computing autocorrelation of the tile boundary locations.

8. The system as in claim 5, wherein the detecting means includes means for finding the tile sizes in each frame within the located segment, by computing the frequency transform of the tile boundary locations.

9. A computer program product for automatically detecting a segment where a mosaic fade, formed by a plurality of tiles, comprising: a computer readable storage medium having a computer program stored thereon for performing the steps of:
   (a) locating the segment of the digital video containing the plurality of tiles in each frame;
   (b) detecting whether the tiles, within the located segment, have a predetermined increase or decrease in size from one frame to a next frame;
   (c) identifying a boundary of the mosaic fade based on step (b).

10. The computer program product as in claim 9, wherein step further includes the steps of:
    (d) fitting a curve to a plot of the tile size verses frame number
    (e) analyzing the fitted curve to determine the presence of mosaic fade, its type, and its duration.

11. The computer program product as in claim 9, wherein step (b) further includes finding the tile sizes in each frame within the located segment, by computing autocorrelation of the tile boundary locations.

12. The computer program product as in claim 9, wherein step (b) further includes finding the tile sizes in each frame within the located segment, by computing the frequency transform of the tile boundary locations.

* * * * *